July 16, 1940.
A. CRHA
2,208,071
HARVESTER ACCESSORY
Filed Aug. 29, 1939
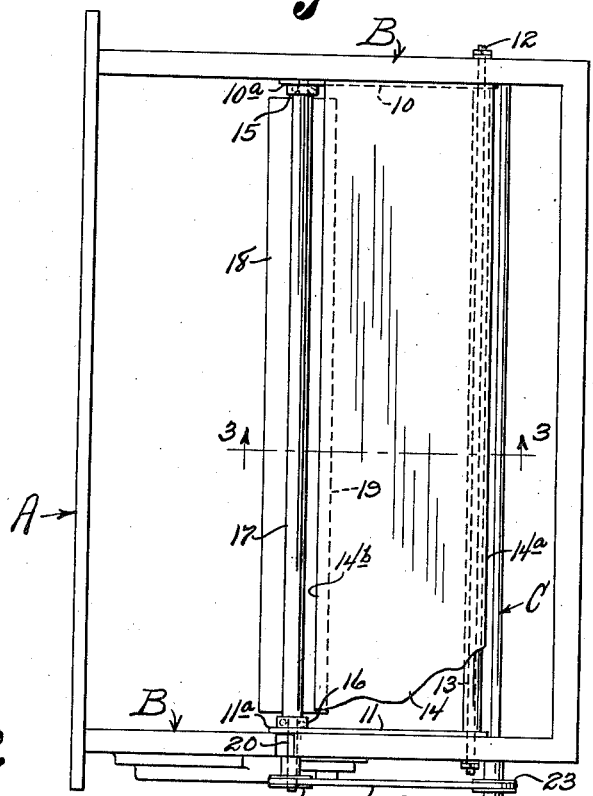
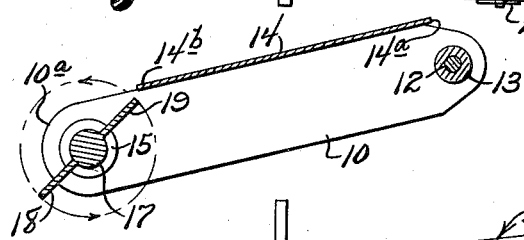
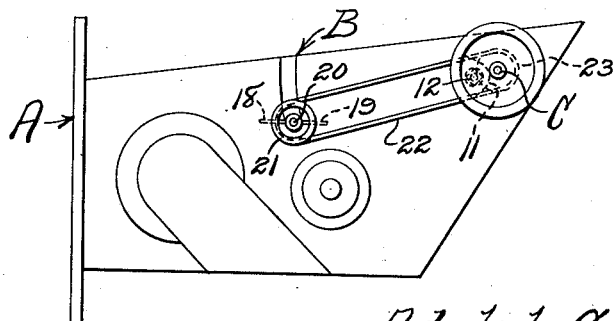
Adolph Crha
INVENTOR
BY Victor J. Evans & Co.
ATTORNEYS Patented July 16, 1940

2,208,071

UNITED STATES PATENT OFFICE 2,208,071

HARVESTER ACCESSORY

Adolph Crha, Ravinia, S. Dak.

Application August 29, 1939, Serial No. 292,528

2 Claims. (Cl. 130—1)

This invention relates to improvements in harvesting devices and particularly is concerned with a novel attachment especially suited to use with the Allis-Chalmers "All-Crop" harvester for assisting in the transfer of cut grain stalks from the conveyer to the threshing cylinder.

It is an object of this invention to provide a novel and simple device for replacing the upper canvas of certain types of harvesting machines, especially the Allis-Chalmers "All-Crop" harvester for facilitating transfer of cut grain stalks from the conveyer mechanism of the harvesting machine to the threshing cylinder thereof.

In existing types of harvester machines, a noteworthy disadvantage is that, in the harvesting of crops such as kaffir corn and similar grains having relatively hard stalks, the upper canvas cooperating with the beaters is subject to considerable and rapid wear being punched by the sharp stalk ends whereby the useful life of the canvas is diminished to a degree such that an industrial want has long been felt for a device to replace the beater and canvas combination. It is an object of the instant invention to provide a device of this character thereby satisfying the mentioned industrial want, the new device being characterized in that it is not subject to appreciable wear during ordinary use and in most instances has a useful life equal to or exceeding that of the harvesting machine with which it is used irrespective of the type of crop harvested.

Another object of the instant invention is to provide a transfer device for throwing the cut crop into the threshing cylinder which does not include canvas conveyer fabrics or wood parts which would be subject to wear or deterioration during normal use. Instead, the device, according to this invention, preferably is constructed and is especially suited to being constructed entirely of steel or other similar wear resistant material.

Other objects of the present invention and also advantages and features of the device constructed in pursuance of the teachings thereof will be apparent to those skilled in this art during the course of the following description.

Regarded in certain of its broader aspects, the novel harvester machine accessory according to this invention comprises a pair of arms suited to being freely swingingly mounted upon a rod position in parallelism to the upper power driven shaft of a harvester machine conveyer, said arms being mutually extensive and being provided at their free distal ends with bearing elements whereby a freely rotatable spindle can be carried in the arm ends disposed in spaced parallelism to the power driven shaft aforesaid, a pair of diametrically positioned blades mounted on said spindle and a platform attached to uppermost edges of said arms normally extending downwardly toward said blades from the locality of the shaft, and a pulley drive connecting the power driven shaft and the spindle whereby grain stalks disposed upon the upper parts of said platform move by gravity therealong and fall upon the blades of the rotating spindle from which and by which they are thrown to the threshing cylinder.

In order to facilitate a fuller and more complete understanding of the matter of this invention and also the manner in which the device according thereto is best suited for use in conjunction with existing types of harvesting machines, a specific embodiment of this invention herein illustrated will be hereinafter described, it being clearly understood however that the illustrated embodiment is provided solely by way of example of the preferred application of this invention and is not to be construed as a limitation thereon except as same is expressed in the subjoined claims.

Referring then to the drawing,

Fig. 1 is essentially a top plan view of the instantly preferred embodiment of this invention illustrating same mounted for use in parts of a harvesting machine;

Fig. 2 is substantially a side elevational view of the device illustrated in Fig. 1, and Fig. 3 is a vertical sectional view of Fig. 1 taken along the line 3—3 thereof.

Referring now to the drawing, the letter A generally designates a portion of a harvesting machine in the general locality of the threshing cylinder thereof and the letter B designates parts of the frame-work of the harvesting machine extending laterally from the threshing cylinder and upwardly toward the locality from which the grain stalks are fed to the moving parts of the device. A power driven shaft C is positioned near but below the conveyer which brings the grain stalks from the cutter (not shown).

A pair of arms 10 and 11 freely rotatably mounted upon a fixedly positioned rod 12 fastened to the frame elements B and spaced by the tubular member 13 are disposed within the framework of the harvesting machine essentially as shown. It will be noted that the arms are mutually coextensive and are joined by the plate 14 attached to the uppermost edge portion of each arm whereby the arms are held in spaced parallelism. It will be understood of course that the upper edge portion 14a of the plate 14 is positioned beneath the end of the conveyer belt whereby stalks can be transferred to the surface of the plate which, in effect, is a platform and, because the plate is slantingly disposed as shown, will travel thereover by action of gravity as hereinafter will more fully be described.

In the distal free end portions 10a and 11a respectively of the arms 10 and 11, bearing elements 15 and 16 are provided wherein is journalled the arbor 17 carrying diametrically positioned fins 18 and 19 essentially as shown in Fig. 1 of the drawing. The fins 18 and 19 extend from the spindle 17 toward but do not touch the end portion 14b of the plate 14. The end portion of the spindle 17 is extended to provide the arbor 20 carrying the pulley wheel 21 connected by means of a belt 22 to the pulley 23 mounted on the shaft hereinabove described whereby rotation of the shaft C causes rotation of the spindle 17.

In use of the device the grain stalks are fed upon the upper end 14a of the plate 14 and descend thereover by action of gravity to the end 14b thereof which, it will be noted, is disposed lower than the end 14a. The stalks when they reach the end 14b of the plate 14 fall upon the blades 18 and 19 carried by the revolving spindle 17 and are thrown thereby to the threshing cylinder (not shown).

It will be apparent from the foregoing that the device according to the instant invention replaces without loss of effect the upper canvas endless conveyer employed in threshing machines for moving and distributing grain stalks to the threshing cylinder.

Having thus described the present invention, what it is desired to secure by Letters Patent is:

1. In a harvesting machine the improvement which comprises a fixedly mounted rod positioned near the threshing cylinder and in essentially parallel relationship thereto; a pair of arms swingingly mounted in axial spaced relation on said rod; a flat platform mounted on said arms normally positioned slanting downwardly toward the cylinder; a freely rotating motor driven spindle journaled in the distal ends of the arms; and diametrically extending blades essentially fixedly mounted on the spindle for receiving materials discharged from said platform and for throwing same upon the threshing cylinder.

2. In a harvesting machine of the type comprising a threshing cylinder and a supported power driven rotating shaft in spaced parallelism thereto; the improvement which comprises a fixedly mounted rod; a pair of mutually coextensive arms, one end of each arm being freely swingingly mounted on said rod; a flat platform holding the arms in spaced parallelism mounted on uppermost edges of said arms normally positioned slantingly downwardly relative to the shaft and toward the cylinder; a freely rotatable spindle journaled in the distal free ends of the arms; a pulley drive connecting said spindle with the shaft for rotating the former; and diametrically extending blades essentially fixedly mounted on the spindle for receiving materials from the platform and throwing same upon the threshing cylinder.

ADOLPH CRHA.